US008762861B2

(12) United States Patent
Hyndman et al.

(10) Patent No.: US 8,762,861 B2
(45) Date of Patent: Jun. 24, 2014

(54) METHOD AND APPARATUS FOR INTERRELATING VIRTUAL ENVIRONMENT AND WEB CONTENT

(75) Inventors: Arn Hyndman, Ottawa (CA); Nicholas Sauriol, Ottawa (CA); Christopher Andrew Hatko, Ottawa (CA)

(73) Assignee: Avaya, Inc., Basking Ridge, NJ (US)

( * ) Notice: Subject to any disclaimer, the term of this patent is extended or adjusted under 35 U.S.C. 154(b) by 477 days.

(21) Appl. No.: 12/344,562

(22) Filed: Dec. 28, 2008

(65) Prior Publication Data

US 2010/0169795 A1 Jul. 1, 2010

(51) Int. Cl.
*G06F 3/048* (2013.01)

(52) U.S. Cl.
USPC .......................................... 715/757; 715/848

(58) Field of Classification Search
None
See application file for complete search history.

(56) References Cited

U.S. PATENT DOCUMENTS

| | | | | |
|---|---|---|---|---|
| 6,572,662 | B2 * | 6/2003 | Manohar et al. | 715/273 |
| 6,636,242 | B2 * | 10/2003 | Bowman-Amuah | 715/764 |
| 6,981,220 | B2 * | 12/2005 | Matsuda | 715/706 |
| 7,437,614 | B2 * | 10/2008 | Haswell et al. | 714/38.13 |
| 7,467,356 | B2 * | 12/2008 | Gettman et al. | 715/850 |
| 2006/0184886 | A1 * | 8/2006 | Chung et al. | 715/758 |
| 2007/0011617 | A1 * | 1/2007 | Akagawa et al. | 715/738 |
| 2007/0078963 | A1 * | 4/2007 | Woodard et al. | 709/223 |
| 2008/0028302 | A1 | 1/2008 | Meschkat | |
| 2008/0108432 | A1 | 5/2008 | Cohen et al. | |
| 2008/0235582 | A1 * | 9/2008 | Zalewski et al. | 715/716 |
| 2008/0268418 | A1 * | 10/2008 | Tashner et al. | 434/365 |
| 2009/0070692 | A1 * | 3/2009 | Dawes et al. | 715/764 |
| 2009/0241037 | A1 * | 9/2009 | Hyndman | 715/757 |
| 2009/0241071 | A1 * | 9/2009 | Seacat et al. | 715/856 |
| 2010/0306318 | A1 * | 12/2010 | Fitzpatrick et al. | 709/206 |

OTHER PUBLICATIONS

Bhasin, "Making Use of Javascript" Jul. 2002, John Wiley & SOns, cover p., and pp95-110.*
Written Opinion of the International Searching Authority from corresponding PCT application PCT/CA2009/000381.
"Daden Launches Web Browser for Second Life" Jul. 15, 2008, http://www.daden.co.uk/press_releases/080715_daden_lanunches_web_brw.html.
Bhasin, "Making Use of JavaScript" Jul. 2002, John Wiley & Sons, p. 109.
"Yoowalk, a virtual world to surf the web in 3D," Jul. 2, 2008 http://www.secondlifepros.com/yoowalk-a-virtual-world-to-surf-the-web-in-3D/ see whole document.

* cited by examiner

*Primary Examiner* — William Titcomb
(74) *Attorney, Agent, or Firm* — Anderson Gorecki & Rouille LLP

(57) ABSTRACT

Interaction with web content in a web browser can control actions in an embedded virtual environment, and events in the virtual environment can be used to update content and applications running in the web browser. In one embodiment, particular events in the virtual environment are passed to a mapping component that listens for triggers and issues commands in the web browser. A JavaScript mapping component may be used to listen for the triggers, capture parameters associated with the trigger, lookup the trigger type in a mapping table, and call a mapped JavaScript function with the trigger parameters. In the reverse direction, if a JavaScript function call is entered in the web browser, the JavaScript function invokes a function exposed by a virtual environment plugin. The plug-in invokes an event within the virtual environment so that interaction with the web content can control actions in the virtual environment.

13 Claims, 5 Drawing Sheets

METHOD AND APPARATUS FOR INTERRELATING VIRTUAL ENVIRONMENT AND WEB CONTENT

CROSS-REFERENCE TO RELATED APPLICATIONS

None

BACKGROUND OF THE INVENTION

1. Field of the Invention

The present invention relates virtual environments and, more particularly, to a method and apparatus for inter-relating virtual environment and web content.

2. Description of the Related Art

Virtual environments simulate actual or fantasy 3-D environments and allow for many participants to interact with each other and with constructs in the environment via remotely-located clients. One context in which a virtual environment may be used is in connection with gaming, although other uses for virtual environments are also being developed.

In a virtual environment, an actual or fantasy universe is simulated within a computer processor/memory. Multiple people may participate in the virtual environment through a computer network, such as a local area network or a wide area network such as the Internet. Each player selects an "Avatar" which is often a three-dimensional representation of a person or other object to represent them in the virtual environment. Participants send commands to a virtual environment server that controls the virtual environment to cause their Avatars to move within the virtual environment. In this way, the participants are able to cause their Avatars to interact with other Avatars and other objects in the virtual environment.

A virtual environment often takes the form of a virtual-reality three dimensional map, and may include rooms, outdoor areas, and other representations of environments commonly experienced in the physical world. The virtual environment may also include multiple objects, people, animals, robots, Avatars, robot Avatars, spatial elements, and objects/environments that allow Avatars to participate in activities. Participants establish a presence in the virtual environment via a virtual environment client on their computer, through which they can create an Avatar and then cause the Avatar to "live" within the virtual environment.

As the Avatar moves within the virtual environment, the view experienced by the Avatar changes according to where the Avatar is located within the virtual environment. The views may be displayed to the participant so that the participant controlling the Avatar may see what the Avatar is seeing. Additionally, many virtual environments enable the participant to toggle to a different point of view, such as from a vantage point outside of the Avatar, to see where the Avatar is in the virtual environment.

The participant may control the Avatar using conventional input devices, such as a computer mouse and keyboard. The inputs are sent to the virtual environment client which forwards the commands to one or more virtual environment servers that are controlling the virtual environment and providing a representation of the virtual environment to the participant via a display associated with the participant's computer.

Depending on how the virtual environment is set up, an Avatar may be able to observe the environment and optionally also interact with other Avatars, modeled objects within the virtual environment, robotic objects within the virtual environment, or the environment itself (i.e. an Avatar may be allowed to go for a swim in a lake or river in the virtual environment). In these cases, client control input may be permitted to cause changes in the modeled objects, such as moving other objects, opening doors, and so forth, which optionally may then be experienced by other Avatars within the virtual environment.

"Interaction" by an Avatar with another modeled object in a virtual environment means that the virtual environment server simulates an interaction in the modeled environment, in response to receiving client control input for the Avatar. Interactions by one Avatar with any other Avatar, object, the environment or automated or robotic Avatars may, in some cases, result in outcomes that may affect or otherwise be observed or experienced by other Avatars, objects, the environment, and automated or robotic Avatars within the virtual environment.

A virtual environment may be created for the user, but more commonly the virtual environment may be persistent, in which it continues to exist and be supported by the virtual environment server even when the user is not interacting with the virtual environment. Thus, where there is more than one user of a virtual environment, the environment may continue to evolve when a user is not logged in, such that the next time the user enters the virtual environment it may be changed from what it looked like the previous time.

Virtual environments are commonly used in on-line gaming, such as for example in online role playing games where users assume the role of a character and take control over most of that character's actions. In addition to games, virtual environments are also being used to simulate real life environments to provide an interface for users that will enable on-line education, training, shopping, workplace collaboration, and other types of interactions between groups of users and between businesses and users.

As Avatars encounter other Avatars within the virtual environment, the participants represented by the Avatars may elect to communicate with each other. For example, the participants may communicate with each other by typing messages to each other or an audio bridge may be established to enable the participants to talk with each other.

There are times when it would be advantageous to integrate external content and applications into the three dimensional computer-generated virtual environment. For example, it may be desirable to enable the user to have access to web-based content and web-based applications. There is a vast array of web applications that have been developed and which are available on the Internet. This trend is likely to continue as well. For example, customer relationship management software, enterprise resource planning, document management, calendars, e-mail, and other applications are all available on-line. Similarly, vast amounts of static and dynamic content are available on-line for free or on a subscription basis.

Unfortunately, web content and web applications have not been integrated with virtual environments. Although some virtual environments enable web content to be displayed (mapped) to a three-dimensional surface in the virtual environment, depending on the implementation this typically does not enable users of the virtual environment to interact with the web content. For example, if a web page is displayed in the virtual environment, the users of the virtual environment may not be able to click on links in the web page but may only be able to see the web page. In other implementations, only limited types of content may be available, and the virtual environment may not enable other types of content such as FLASH video, games, etc. to be provided in the virtual environment. Thus, embedding web content in virtual environments has, to date, been less than ideal. Additionally, these solutions do not enable applications to be implemented within the virtual environment and are generally limited to mapping web content to a surface of the three dimensional computer-generated virtual environment.

Some virtual environments enable a web browser to be launched from the virtual environment. This results in a very limited form of integration between the virtual environment and the web content, since the act of launching the web browser will cause a new window (pop-up) to be opened within which the web content is rendered. Each time the user elects to receive content in this manner a new window (or new tab) will be opened to provide the user with the selected web content. However, the user is not able to use the web content to influence the virtual environment but rather is relegated to interacting with the web content separately from the virtual environment.

It is also possible to embed a virtual environment within an Internet (web) browser, such that the virtual environment is accessed through the web browser. A virtual environment that is rendered in a web browser will be referred to as a "web embedded virtual environment." Embedding a virtual environment in an Internet browser enables web based content to be displayed alongside the virtual environment in the web-browser window rather than in a pop-up window. The user can thus use one part of the browser window to view web content, and can interact with the virtual environment in another part of the web browser window.

Unfortunately, even where the virtual environment is embedded in a web browser, the content shown in the web browser is not related to the content of the virtual environment. Rather, the virtual environment and web browser independent, such that the activities that the user takes in the web browser are not reflected in the virtual environment and vice-versa. Moreover, the applications running in the web browser do not react to or influence the state of the 3D virtual environment.

SUMMARY OF THE INVENTION

A virtual environment may be rendered in a web browser such that events in the three dimensional computer-generated virtual environment cause updates to content and other applications running in the web browser. Similarly, actions taken in connection with applications and content on the web browser cause effects in the virtual environment. In one embodiment, objects referred to as triggers in the virtual environment generate events when triggered by some activity in the virtual environment. Parameters associated with the events are captured and passed to a JavaScript mapping component in the virtual environment, looks up the event type in a mapping table, and call a mapped JavaScript function with the event parameters. In the reverse direction, if a JavaScript function call is entered in the web browser, the JavaScript function call invokes a function exposed by a virtual environment, including parameters from the web. The function generates an event within the virtual environment which can be captured by virtual environment scripting and/or event mechanism to cause actions in the virtual environment. This creates a hybrid application that leverages the benefits of both the virtual environment and the web application to create a mashup between the two. This enables the benefits of the web application to be used in the virtual environment, and enables the communication capabilities and other capabilities of the virtual environment to enhance the capabilities of the web application.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
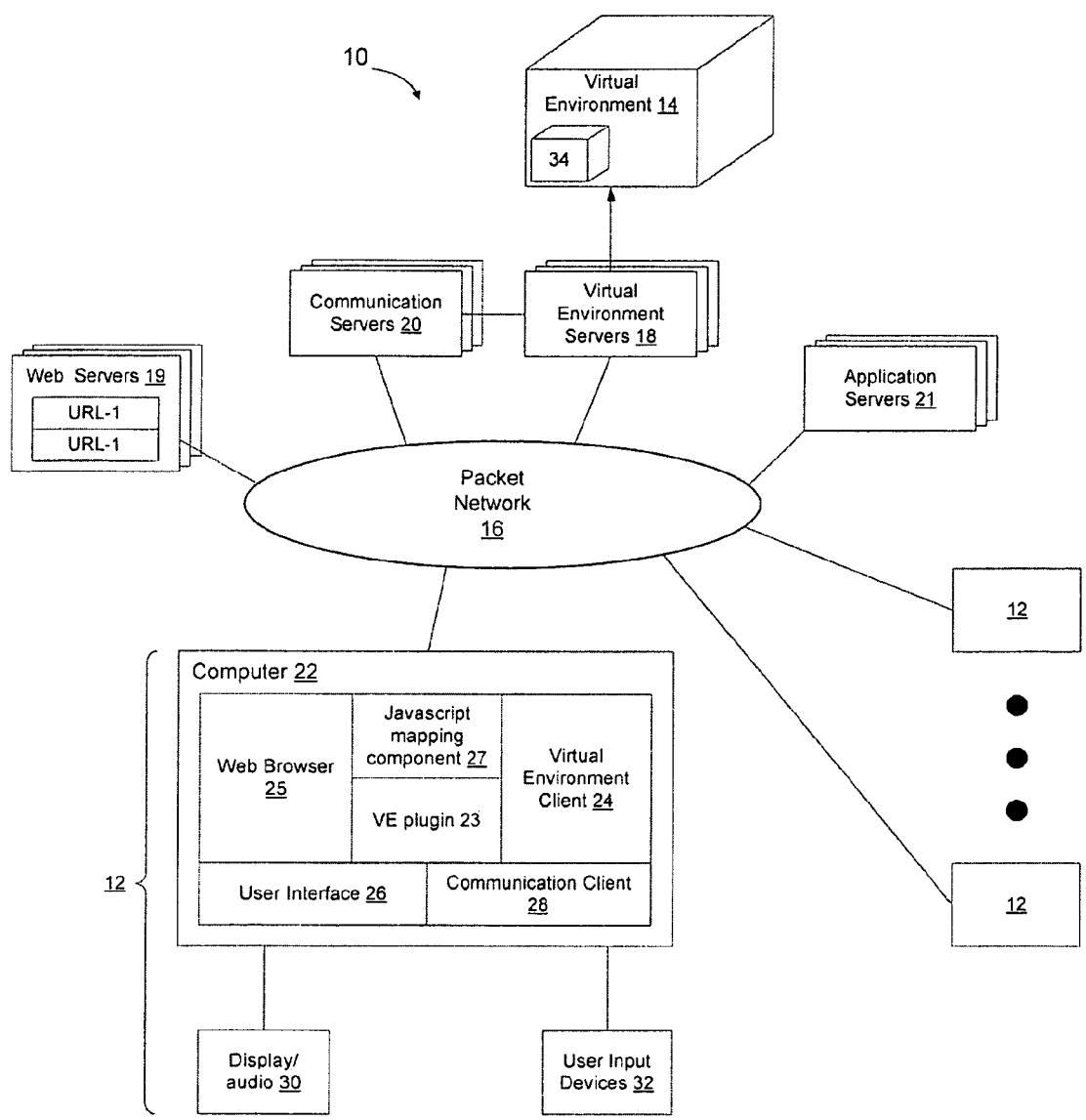
FIG. 1 is a functional block diagram of a portion of an example system enabling web content to be interrelated with virtual environment context according to an embodiment of the invention.

FIG. 1 shows a portion of an example system 10 that may enable virtual environment and web browser content to be interrelated. In the example shown in FIG. 1, a user 12 may access the virtual environment 14 from their computer 22 over a packet network 16 or other common communication infrastructure. The virtual environment 14 is implemented by one or more virtual environment servers 18. Communication sessions between the users 12 may be implemented by one or more communication servers 20. Web servers 19 and application servers 21 enable the user's to access web content and hosted applications over the network 16.

The virtual environment may be implemented as using one or more instances, each of which may be hosted by one or more virtual environment servers. Where there are multiple instances, the Avatars in one instance are generally unaware of Avatars in the other instance. Conventionally, each instance of the virtual environment may be referred to as a separate World. Avatars in a given world are allowed to communicate with other users that also have Avatars in the same world over a communication session hosted by the communication server 20.

The virtual environment 14 may be any type of virtual environment, such as a virtual environment created for an on-line game, a virtual environment created to implement an on-line store, a virtual environment created to implement an on-line training facility, to enable business collaboration, or for any other purpose. Virtual environments are being created for many reasons, and may be designed to enable user interaction to achieve a particular purpose. Example uses of virtual environments include gaming, business, retail, training, social networking, and many other aspects.

Generally, a virtual environment will have its own distinct three dimensional coordinate space. Avatars representing users may move within the three dimensional coordinate space and interact with objects and other Avatars within the three dimensional coordinate space. The virtual environment servers maintain the virtual environment, and a virtual environment client is used to render a visual presentation for each user based on the location of the user's Avatar within the virtual environment. The view may also depend on the direction in which the Avatar is facing and the selected viewing option, such as whether the user has opted to have the view appear as if the user was looking through the eyes of the Avatar, or whether the user has opted to pan back from the Avatar to see a three dimensional view of where the Avatar is located and what the Avatar is doing in the three dimensional computer-generated virtual environment.

Each user 12 has a computer 22 that may be used to access the three-dimensional computer-generated virtual environment. The computer 22 will run a virtual environment client 24 and a user interface 26 to the virtual environment. The user interface 26 may be part of the virtual environment client 24 or implemented as a separate process. A separate virtual environment client may be required for each virtual environment that the user would like to access, although a particular virtual environment client may be designed to interface with multiple virtual environment servers. A communication client 28 is provided to enable the user to communicate with other users who are also participating in the three dimensional computer-generated virtual environment. The communication client may be part of the virtual environment client 24, the user interface 26, or may be a separate process running on the computer 22.

The user may see a representation of a portion of the three dimensional computer-generated virtual environment on a display/audio 30 and input commands via a user input device 32 such as a mouse, touch pad, or keyboard. The display/audio 30 may be used by the user to transmit/receive audio information while engaged in the virtual environment. For example, the display/audio 30 may be a display screen having a speaker and a microphone. The user interface generates the output shown on the display under the control of the virtual environment client, and receives the input from the user and passes the user input to the virtual environment client. The virtual environment client passes the user input to the virtual environment server which causes the user's Avatar 34 or other object under the control of the user to execute the desired action in the virtual environment. Thus, the user may control a portion of the virtual environment, such as the person's Avatar or other objects in contact with the Avatar, to change the virtual environment for the other users of the virtual environment.

Typically, an Avatar is a three dimensional rendering of a person or other creature that represents the user in the virtual environment. The user selects the way that their Avatar looks when creating a profile for the virtual environment and then can control the movement of the Avatar in the virtual environment such as by causing the Avatar to walk, run, wave, talk, or make other similar movements. Thus, the block 34 representing the Avatar in the virtual environment 14, is not intended to show how an Avatar would be expected to appear in a virtual environment. Rather, the actual appearance of the Avatar is immaterial since the actual appearance of each user's Avatar may be expected to be somewhat different and customized according to the preferences of that user. Since the actual appearance of the Avatars in the three dimensional computer-generated virtual environment is not important to the concepts discussed herein, Avatars have generally been represented herein using simple geometric shapes or two dimensional drawings, rather than complex three dimensional shapes such as people and animals.

As shown in FIG. 1, the user's computer 22 also includes a JavaScript mapping component 27 designed to watch for events in the virtual environment, looks up the event in an event table to determine the event type, and passes the event type and parameters to an exposed JavaScript function in the web browser. Similarly, the JavaScript mapping function enables input from the web browser to be passed to a function exposed by the virtual environment, e.g. via plugin 23, so that interaction with web content can cause particular events to occur within the virtual environment. In one embodiment, the virtual environment may include triggers that generate events when triggered by an activity in the environment. The events may then be captured by the JavaScript mapping function. Some triggers may be chainable as well, such that the trigger listens for (is triggered by) an event and then, in turn, generates another event.

Figure 2:
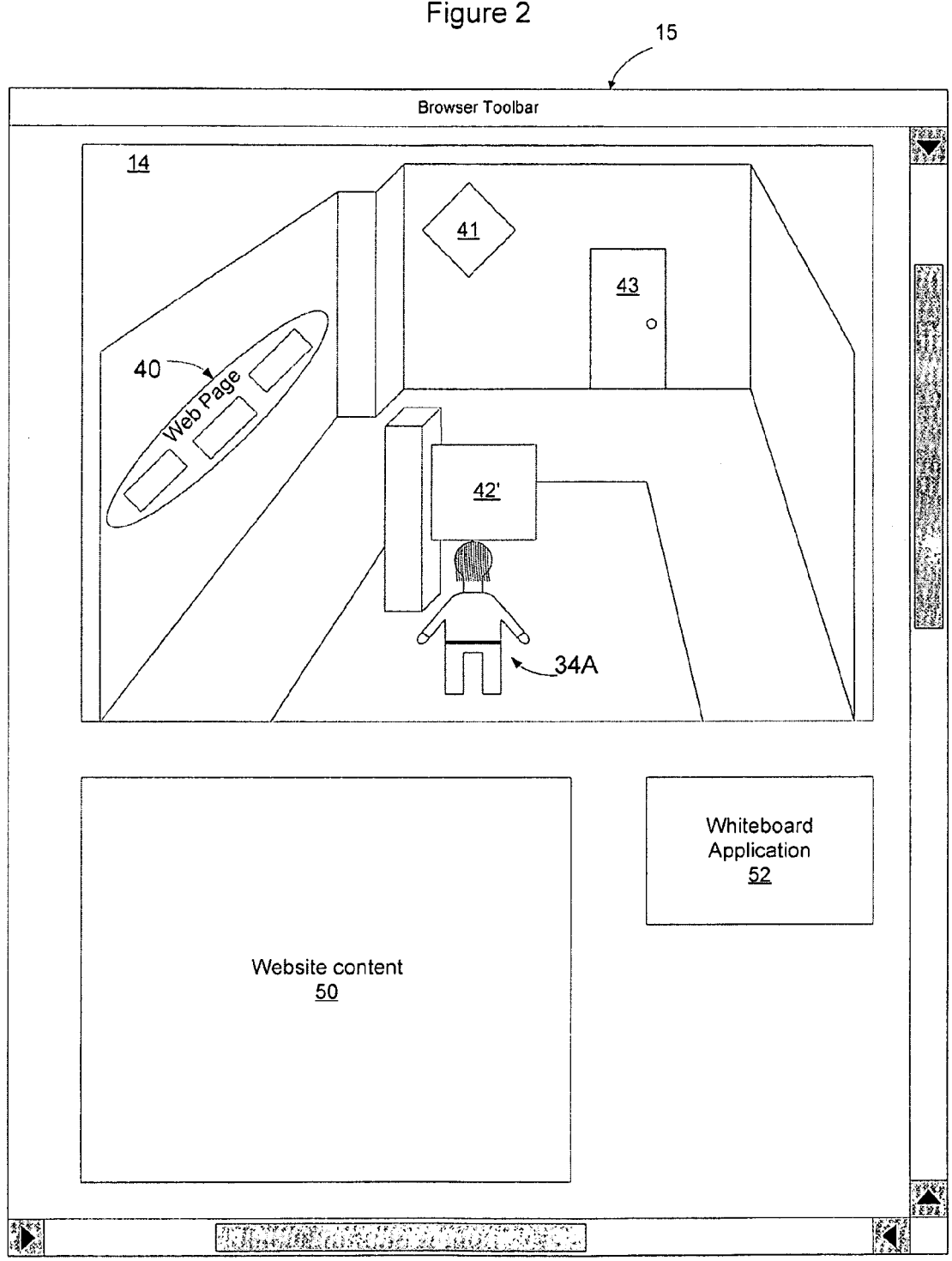
FIGS. 2-4 are block diagrams showing an example web browser with an embedded virtual environment.
Figure 3:
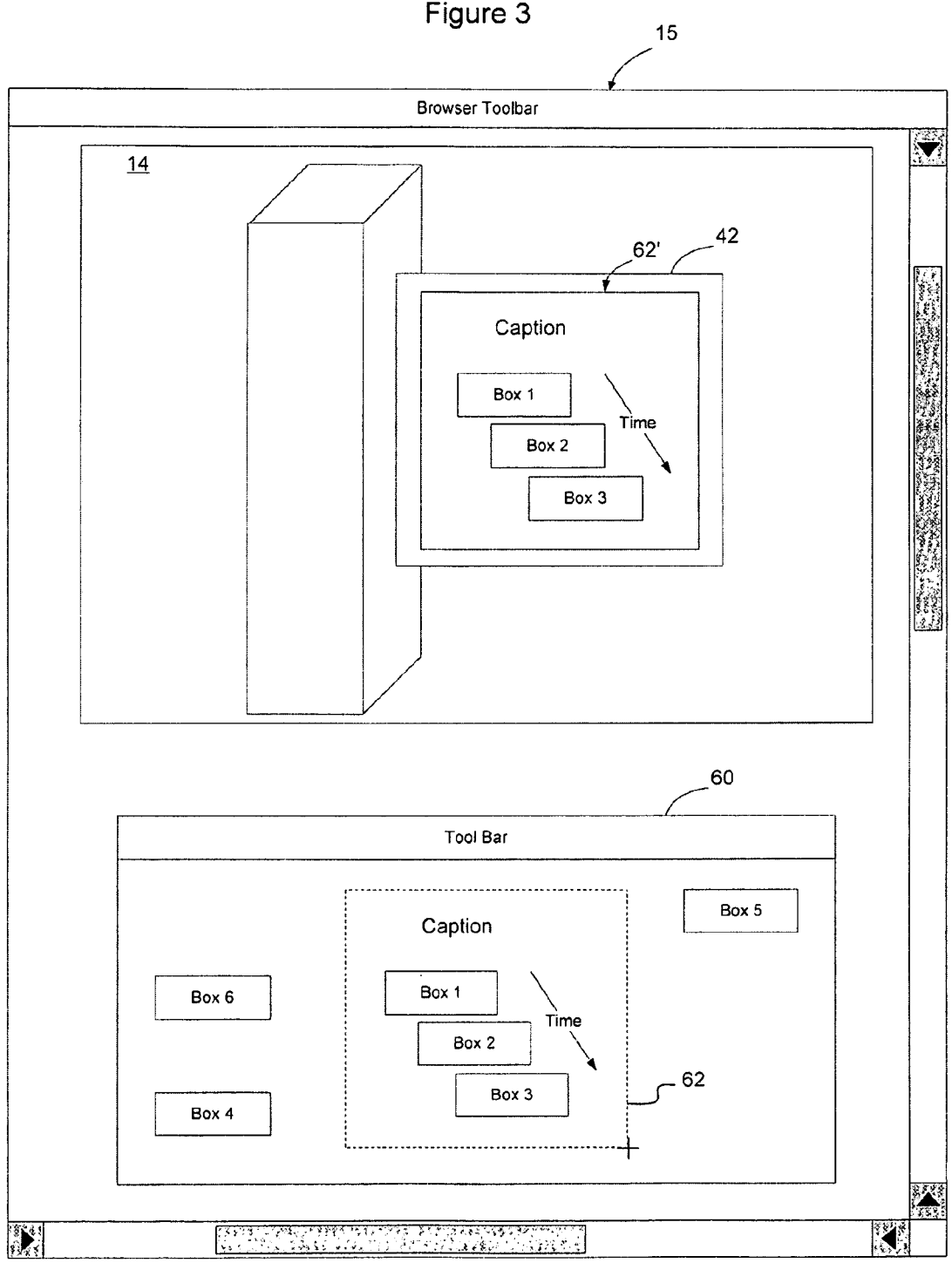

FIG. 2 shows an example three dimensional computer-generated virtual environment. In the example shown in FIG. 2, an Avatar 34A is shown standing in front of a sign 42 that is attached to a post. The user may use the user interface 26 to cause the Avatar to walk around within the virtual to approach objects within the virtual environment. For example, the user may cause the Avatar to walk up to the sign 42 as shown in FIG. 3, may cause the Avatar to walk over to the oval shaped window 40, to move toward the window 41, door 43, or elsewhere in the virtual environment. The user may be presented with a view of the virtual environment that is set back from the Avatar (as shown in FIG. 2) to see where the Avatar is located within the virtual environment. Alternatively, the user may be presented with a view that represents what the Avatar is seeing in the virtual environment, as if the user were looking through the Avatar's eyes into the virtual environment (FIG. 3).

In the example shown in FIG. 2, the three dimensional computer-generated virtual environment is embedded in a browser window 15 supported by web browser application 25. According to an embodiment of the invention, as the user manipulates their Avatar within the virtual environment, particular events in the virtual environment will cause the website content displayed in the browser window 15 to be updated. For example, when the user entered the room and approached the area 42, this action may be interpreted as an event which may cause a whiteboard application 52 to be launched in the user's browser. As another example, if the user were to manipulate their browser to go over to the door 43 and open the door, the act of opening the door may be interpreted as an event to update the web content 50, close whiteboard application 52, launch a new application, or take other action inside the web browser.

According to one embodiment, the virtual environment may be rendered in a web browser such that events in the three dimensional computer-generated virtual environment cause updates to web content in the web browser in which the virtual environment is embedded. The updates to the web content may be implemented by causing the web browser to obtain content associated with a new Uniform Resource Locator, or by causing the web browser to provide input to one or more applications running within the web browser.

For example, actions by the user in the virtual environment and other events may cause updated information to be passed to a whiteboard application 52 that is also running in the web browser. Similarly, as shown in FIG. 3, updates to the whiteboard application may be shown on an associated surface in the virtual environment. Thus, a mashup may be created in which web applications react to and influence the state of the virtual environment, and in which actions within the virtual environment influence the state of the web applications.

According to an embodiment of the invention, the user's interaction with the three dimensional virtual environment is monitored to look for specific events in the virtual environment. In one embodiment, objects called triggers in the virtual environment generate events when triggered by some activity in the virtual environment. Examples of possible actions that may be captured include when a user enters or leaves a region in the virtual environment (i.e. the user enters/leaves a room); the user approaches or leaves a particular person; the user starts/stops talking to another user; the user clicks on an object; the user invokes a control feature to enable their Avatar to take special action within the virtual environment; or the user starts/stops/updates content mapped to a surface of the virtual environment. Other actions may be captured by triggers as well, and this list is merely meant to show several examples of possible actions that may be captured and interpreted as events.

When a trigger generates an event, the event will be provided to a JavaScript mapping function 27 which runs inside of the virtual environment and listens for events. The JavaScript mapping function calls a particular JavaScript function which runs in the web browser with a set of parameters. The parameters include the identity of the user who caused the event (if available) any event parameters, and a string which can be used by the JavaScript logic to decide what to do. Typically, the single JavaScript function exposed by the web browser will then call other JavaScript functions based on the parameters received. It is those secondary JavaScript functions that will actually update the web content, send messages to the web server, or take other action in the web browser.

Different secondary JavaScript functions may be called in the web browser based on the parameters such that different updates to the web content may be prompted by different actions in the virtual environment. For example, when the user's Avatar 34A approaches another person in the virtual environment, the event may be mapped to a secondary JavaScript function to cause the web browser to obtain profile information for the person. The profile information may be from a web server associated with the virtual environment or may be from an independent web server, such as a social networking web server. As another example, assume that a user enters a particular room in the virtual environment that happens to be a virtual computer store. Upon entry into the volume in the virtual environment, a secondary JavaScript function may be called to enable the web content to be updated to provide the user with information about computers that are for sale at that location in the virtual environment. By clicking on one of the computers, the web content may be further updated to show model specifications and options, and to open an application that may be used to customize the particular model.

If the Avatar then picks up an item and carries it to a check-out desk manned by a robot Avatar, this action may cause the web content to be updated by causing the item to be added to the user's shopping cart. The user may then purchase the item through the web site so that the item is shipped to their house. Thus, rather than re-creating an internet commerce site in the virtual environment, the virtual environment may be used to show/educate users about particular products and otherwise used to sell products. However, when a sale is to occur, the user's actions may be captured and used to populate the selected items to the user's shopping cart in the web-based retail infrastructure so that the user may purchase the products through the web-based infrastructure.

Numerous other examples may be provided as well, where it may be advantageous to have particular actions in the virtual environment cause the web content to be updated to provide the user with additional information about other users or aspects of the virtual environment. Optionally, since the web content shown in the virtual environment is displayed on a three dimensional surface, the web content may also be shown in the web browser. Projecting text on to a 3D surface may cause the text to be hard to read, since it may be distorted by parallax. Thus, by displaying the text in the web browser as well, the text may be easier for the user to read.

In one embodiment, an event that is captured by the JavaScript mapping function will only be mapped to a JavaScript function in the user's web browser if the event is associated with an action by the user. This prevents other users from taking actions in the virtual environment that result in changes to the content of the user's web browser or to applications running in the web browser.

Specific Javascript HTML mashup code is written to catch the JavaScript mapping function calls from the virtual environment and convert them into updates to the displayed web content. Many existing technologies for updating web content based on events can be used, including flash, Dynamic HTML (DHTML), frames, etc.

Figure 4:
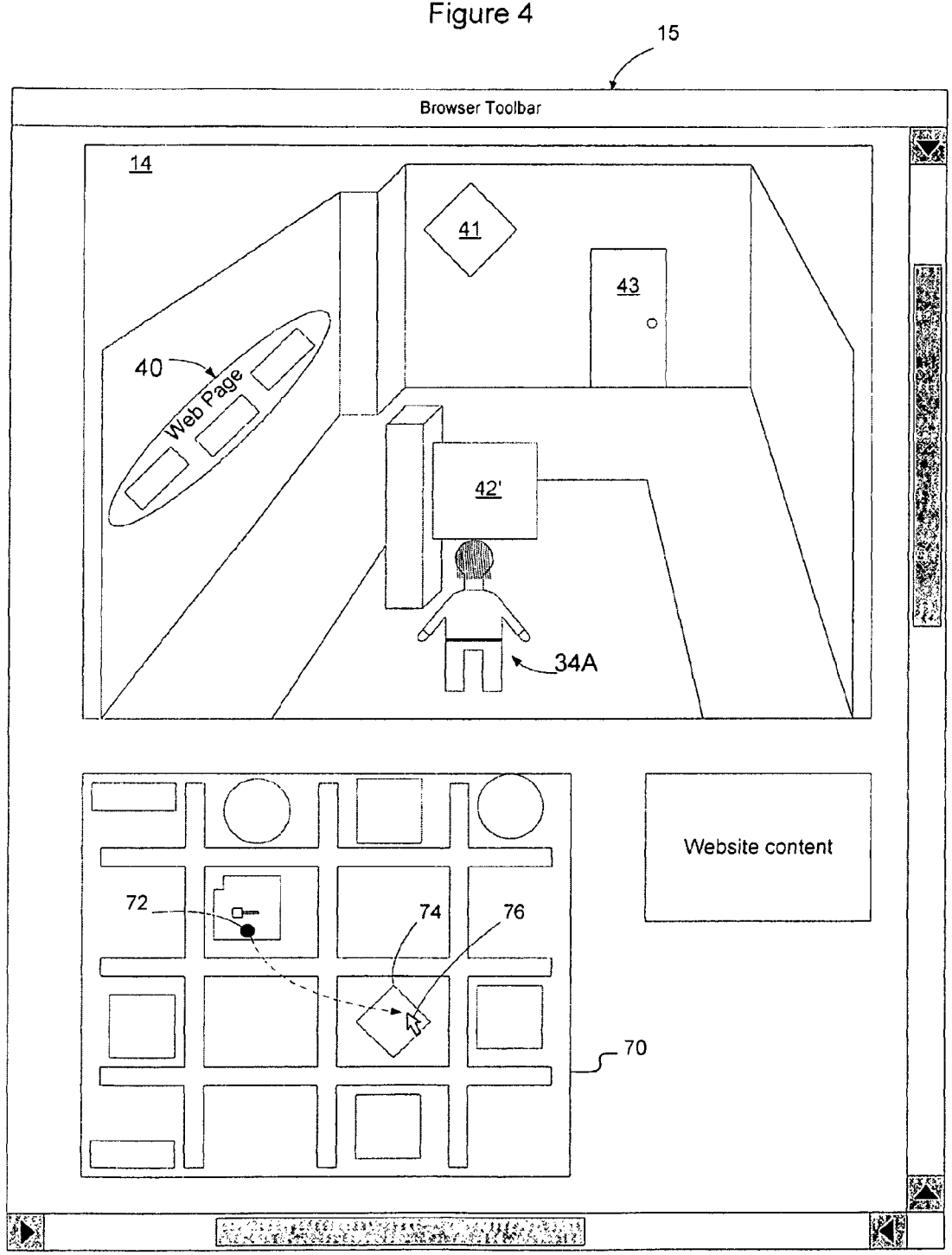

As noted above, FIG. 2 shows an example of how actions in the virtual environment may be captured to enable web content to be updated. FIGS. 3 and 4, by contrast, show examples how interactions with web content may affect aspects of the virtual environment.

In the example shown in FIG. 3, an application 60 such as a white board is running in the web browser. Many applications have been developed to run in web browsers, which may be instantiated on the user's computer, in a web server, an application server, or other server on the network. In the example shown in FIG. 3, the whiteboard application is reflected in the virtual environment on sign 42. By passing the content of the whiteboard to the virtual environment, it may be viewable by multiple virtual environment users. Optionally, the users may also interact with the whiteboard to draw on the whiteboard, etc. These changes may then be captured by the mapping component 27 and used to update the browser based whiteboard application 60.

Many aspects of the interface for the virtual world could be implemented using this technology. For example, the heads up display (HUD) may be rendered using web technology, and users actions on the web page can then be translated into updates to the Avatar position and so forth. This technology may also be used to affect other aspects of the virtual environment, for example Avatar customization may be implemented via a web application that is then mapped to the virtual environment.

In the example shown in FIG. 3, the user has selected a portion 62 of the content of the whiteboard to be displayed on the sign 42 in the virtual environment. The replicated portion 62' thus appears in the virtual environment. As the user interacts with the whiteboard application, JavaScript function calls entered in the web browser will be captured and used to invoke a function exposed by the virtual environment, optionally using Active X, and including parameters from the web application. The plug-in invokes an event within the virtual environment which can be captured by virtual environment scripting and/or event mechanism to invoke actions in the virtual environment. For example, as shown in FIG. 3, the user has used a selection tool to grab a portion of the display to be included in the virtual environment. This portion is reflected as portion 62' in the virtual environment.

FIG. 4 shows another example of how actions in the web browser may be used to manipulate the virtual environment. In this example, a map application 70 is running in the web browser alongside the virtual environment. The map application shows a map of the virtual environment, in which a black dot 72 represents the location of the user in the virtual environment. The virtual environment embedded in the web browser shows the user in the virtual environment. Assume that the user would like to move to the diamond room 74. To do so, the user may position their mouse pointer 76 over the desired location and click on the location on the map. This interaction will be captured and passed to the virtual environment, to cause the Avatar to move to the desired location. The Avatar may instantaneously move to the new location or may be caused to walk/run to the new location depending on the preferences of the virtual environment designer.

When the user clicks on the virtual world map implemented as an application in the web browser, to select a location in the virtual environment, the parameters from the virtual map will cause the virtual environment client to connect to the correct server and teleport the user to the correct location on that server which corresponds to where the user clicked on the map. Other functions may be enabled as well, including providing controls in the web page for manipulating content in the virtual environment. For example, buttons could be provided in the web page, which allow the user to rotate an object in the virtual world in various directions. Similarly, controls for a PowerPoint presentation could be provided to allow a person to flip through a PowerPoint presentation via controls on the web page.

By enabling functions entered into an application running in the web browser to be captured and passed to the virtual environment, the user may interact with applications on the web browser to affect the content of the virtual environment. This enables applications that have been written for web browsers to be used in virtual environments without requiring the applications to be re-written for the new environment. This also allows external applications to control the appearance or the action taken by particular objects in the virtual environment.

Any web-based mechanism for detecting user action or other event that can invoke a JavaScript call may be used to control aspects of the virtual environment. Examples include HTML button presses, links, flash components, applets, etc. The invention is not limited to how the user invokes the JavaScript function call from the web browser.

The JavaScript function call invokes a function exposed by the virtual environment. The function may be exposed using Flash, Java, JavaScript, a plugin 23 which may be implemented using ActiveX, or another technique. The manner in which the function is exposed by the virtual environment will depend on the manner in which the virtual environment is implemented. An example function that may be exposed could be "post<event>". This would allow the web page to post an event into the virtual world so that the virtual world engine could react to it. Other examples may include "teleportto<location>" and "updateavatarskin<skinname>". Of course, other events may be posted into the virtual environment as well and the several listed events are merely examples of types of events that may be posted to the virtual environment.

The exposed function invokes an event within the virtual environment which can be captured by virtual environment scripting and/or event mechanism to invoke actions in the virtual environment. Example functions could be refreshing web based content displayed within the virtual environment, advancing slides such as PowerPoint slides, controlling video, moving the user's Avatar to a new location, triggering animation on objects, or any other desired function. The particular event to be implemented will depend on the virtual environment as well as the application that is running in the web browser. By mapping applications running in the web browser into functions in the virtual environment, it is possible to enable the applications to be shared in the virtual environment without requiring the applications to be ported into the virtual environment. This enables the application to run in a web browser as normal, while enabling the virtual environment to be used to share the application to enhance collaboration.

Figure 5:
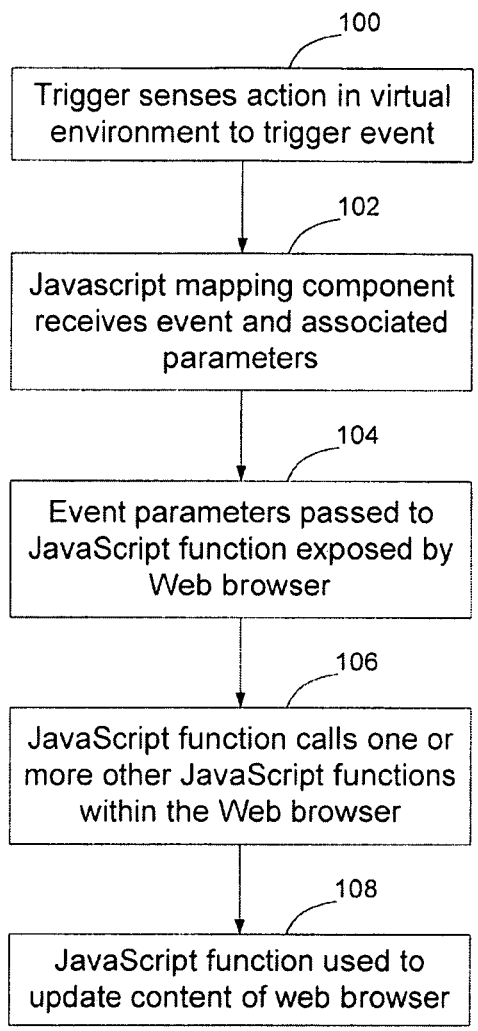
FIG. 5 is a flow chart of an example process that may be used to enable events in the virtual environment to cause web content to be updated.
Figure 6:
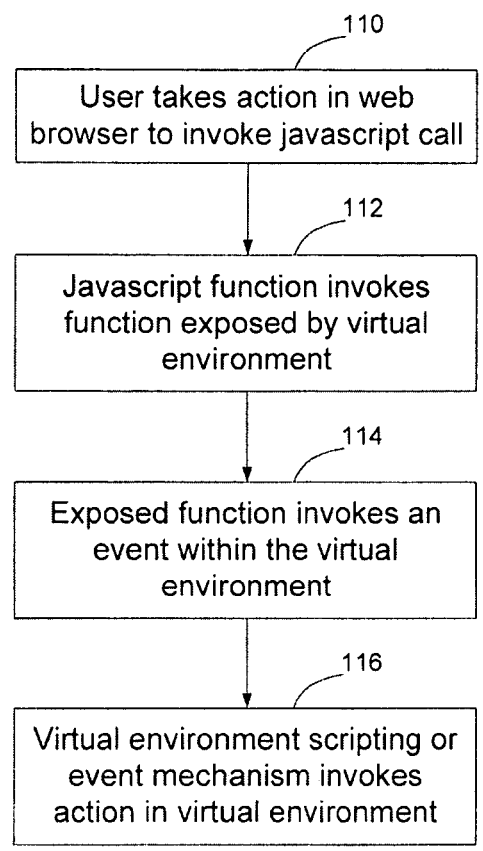
FIG. 6 is a flow chart of an example process that may be used to enable changes in web content to be reflected as actions in the virtual environment.

FIG. 5 shows an example flow diagram illustrating how actions in the virtual environment may be used to affect web content. FIG. 6 shows an example flow diagram of the reverse process—how interaction with web content may affect the virtual environment.

In the example shown in FIG. 5, when a trigger captures a specific event in the virtual environment (100) a virtual event to JavaScript mapping component will receive the event and associated parameters (102), lookup the event to determine an event type, and call a JavaScript function exposed by the web browser with the captured event parameters (104). The JavaScript function will map the event parameters to call one or more other JavaScript functions within the web browser (106) to update the content of the web browser (108). The update may be to cause the browser to obtain new web content or may be passed to an application running in the browser to enable the application to be updated based on the input from the virtual environment.

In the example shown in FIG. 6, when the user takes action in the web browser to invoke a JavaScript call (110), the JavaScript function will invoke a function exposed by a virtual environment (112). The exposed function will invoke an event within the virtual environment (114), and virtual environment scripting or other event mechanism will invoke the associated action in the virtual environment (116).

Although particular modules and pieces of software have been described in connection with performing various tasks associated with enabling web content to be interrelated with a three dimensional computer-generated virtual environment, the invention is not limited to this particular embodiment as many different ways of allocation functionality between components of a computer system may be implemented. Thus, the particular implementation will depend on the particular programming techniques and software architecture selected for its implementation and the invention is not intended to be limited to the one illustrated architecture.

The functions described above may be implemented as one or more sets of program instructions that are stored in a computer readable memory and executed on one or more processors within on one or more computers. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a memory chip, computer memory, memory stick, disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for interrelating web content and a three-dimensional computer-generated virtual environment, the computer program comprising a set of instructions which, when executed by a computer, cause the computer to perform a method comprising the steps of:

instantiating a three dimensional virtual environment client on the computer, the three dimensional virtual environment client rendering a visual presentation for a user based on a location of the user's Avatar within the three-dimensional virtual environment and supporting a client view into the three dimensional computer-generated virtual environment;

instantiating a web browser on the computer for displaying the web content;

detecting, by the three-dimensional virtual environment client, an action of an Avatar within the three-dimensional computer-generated virtual environment to generate an event in the three-dimensional virtual environment client;

capturing, by the three-dimensional virtual environment client, parameters associated with the event;

passing the parameters associated with the event to a JavaScript mapping function in the virtual environment client;

calling, by the JavaScript mapping function in the virtual environment client, a first JavaScript function in the web browser, wherein the step of calling the first JavaScript function causes the parameters associated with the event to be passed from the virtual environment client to the first JavaScript function in the web browser;

calling, by the first JavaScript function in the web browser, second JavaScript functions based on the parameters received by the first JavaScript function; and updating, by the second JavaScript function, the web content displayed by the web browser.

2. The computer-implemented method of claim 1, wherein the parameters include an event type.

3. The method of claim 1, wherein the parameters include an identity of the user who caused the event, and a string which can be used by JavaScript logic associated with the first JavaScript function to select the second JavaScript functions from a plurality of secondary JavaScript functions.

4. The method of claim 1, wherein at least one of the second JavaScript functions enables the web browser to enter a command to an application running in the web browser.

5. The method of claim 1, wherein the JavaScript mapping function listens for the events, captures the parameters associated with the events, and passes the parameters to the exposed JavaScript function exposed by the web browser to enable the selected actions taken in the virtual environment to be reflected as changes to content or to applications running in the web browser.

6. The method of claim 5, wherein the exposed JavaScript function receives the call from the JavaScript mapping function of the virtual environment and calls the second JavaScript functions in the web browser to enable the selected actions taken in the virtual environment to be reflected as changes to content or to applications running in the web browser.

7. The method of claim 1, wherein the virtual environment includes an exposed function configured to receive events from the web browser and use virtual environment scripting to invoke an action in the virtual environment associated with the event to enable the selected changes to content or to applications running in the web browser to be reflected as changes to the virtual environment.

8. The method of claim 1, further comprising the steps of:

receiving input through the web browser to invoke a third JavaScript function call in the web browser;

invoking, by the third JavaScript function call, a function exposed by the virtual environment client to invoke an event within the virtual environment; and using virtual environment scripting to invoke an action in the virtual environment associated with the event.

9. The method of claim 8, wherein the function is invoked using Active X and is exposed by the virtual environment client via a plugin.

10. The method of claim 8, wherein the third JavaScript function call is received from an application running in the web browser and relates to a three dimensional object residing within the virtual environment.

11. The method of claim 10, wherein the third JavaScript function call invokes the event to cause the three dimensional object to move within the virtual environment.

12. The method of claim 10, wherein the third JavaScript function call invokes the event to causes the object to change shape within the virtual environment.

13. The method of claim 10, wherein the third JavaScript function call invokes the event to enable web content to be mapped to a surface of the virtual environment.

* * * * *